United States Patent
Foran

(10) Patent No.: US 7,086,167 B2
(45) Date of Patent: Aug. 8, 2006

(54) OVERMOLDED VIAL FOR USE WITH A LEVEL

(75) Inventor: Thomas P. Foran, Shorewood, WI (US)

(73) Assignee: Empire Level Mfg. Corp., Mukwonago, WI (US)

( * ) Notice: Subject to any disclaimer, the term of this patent is extended or adjusted under 35 U.S.C. 154(b) by 0 days.

(21) Appl. No.: 10/826,853

(22) Filed: Apr. 16, 2004

(65) Prior Publication Data

US 2005/0229412 A1    Oct. 20, 2005

(51) Int. Cl.
G01C 9/24 (2006.01)

(52) U.S. Cl. .......................... 33/379; 33/389

(58) Field of Classification Search .............. 33/365, 33/377, 379–384, 389, 679.1
See application file for complete search history.

(56) References Cited

U.S. PATENT DOCUMENTS

| | | | | |
|---|---|---|---|---|
| 1,082,163 A * | 12/1913 | Lung | .......................... | 33/381 |
| 2,752,693 A * | 7/1956 | Wullschleger | ................ | 33/379 |
| 3,593,428 A * | 7/1971 | Jacoff | .......................... | 33/379 |
| 3,871,109 A * | 3/1975 | Vaida | .......................... | 33/379 |
| 4,347,088 A * | 8/1982 | Jacquet | .......................... | 156/69 |
| 4,436,686 A * | 3/1984 | Drori | .......................... | 264/163 |
| 5,003,699 A * | 4/1991 | Wright | .......................... | 33/379 |
| 5,588,217 A * | 12/1996 | Lindner et al. | ................ | 33/379 |
| 5,651,186 A * | 7/1997 | Lindner et al. | ................ | 33/377 |
| 6,546,638 B1 * | 4/2003 | Beyer | .......................... | 33/348 |
| 6,572,073 B1 * | 6/2003 | Jacoff | .......................... | 249/67 |
| 6,957,494 B1 * | 10/2005 | Foran | .......................... | 33/379 |
| 2002/0124425 A1 * | 9/2002 | Szumer | ........................ | 33/365 |
| 2005/0155241 A1 * | 7/2005 | Scheyer | ........................ | 33/379 |

FOREIGN PATENT DOCUMENTS

| | | | |
|---|---|---|---|
| EP | 455979 A | * | 11/1991 |
| FR | 2449868 A | * | 10/1980 |
| FR | 2785984 A1 | * | 5/2000 |

* cited by examiner

*Primary Examiner*—R. Alexander Smith
(74) *Attorney, Agent, or Firm*—Jansson, Shupe, Munger & Antaramian, Ltd

(57) ABSTRACT

A vial for use in a level and a method of forming such a vial are disclosed. The vial includes a cylinder having an inner surface defining a cavity, and a material molded around the cylinder. The vial preferably includes at least one marker ring positioned between the cylinder and the material. The method comprises providing the cylinder; molding a material around the cylinder; machining the inner surface to a desired shape; and positioning a bubble in the cavity.

18 Claims, 2 Drawing Sheets

OVERMOLDED VIAL FOR USE WITH A LEVEL

FIELD OF THE INVENTION

This invention relates to geometric instruments and, more particularly, to levels (sometimes referred to as "spirit levels" used by carpenters and the like.

BACKGROUND OF THE INVENTION

Levels are used by carpenters, masons, drywallers and the like for helping to assure that surfaces are horizontal, vertical, or at a specified angular relationship to the horizon. A typical level includes at least two vials, one each for ascertaining whether a surface is "level," i.e., horizontal, or "plumb," i.e., vertical.

A level vial comprises a tube made of clear glass or, preferably, clear plastic (acrylic, for example), the barrel-shaped cavity of which is partially filled with a liquid such as mineral spirits. The vial is not completely filled and a bubble is thereby formed when the vial is closed. Typically, two marker rings are applied to the outside of the vial in positions to visually divide the cavity into three portions of about equal length. Level and plumb conditions are ascertained by noting the position of the bubble with respect to the marker rings.

A problem with molding substantially-finished vials is that acrylic, the material predominantly used for making molded vials, does not stretch well. If one attempts manufacture of an acrylic vial which has thick walls (for breakage resistance), the stretch-resisting characteristic of acrylic causes breakage of core pins used in the injection molding process. On the other hand, a thin-wall vial is much more subject to breakage—builder's levels often receiving rough treatment in use.

One known method of avoiding core pin breakage while providing a vial of satisfactory thickness with marker rings is to machine a barrel-shaped inner cavity in a preform. Inner grooves are machined in the inner surface to receive C-shaped rings like common snap rings. Such rings necessarily have a discontinuity or opening about the perimeter so that the ring can be compressed radially for insertion into the cavity. A ring is seated in each of two respective grooves.

A problem with such construction is that the surface transition between the C-shaped ring and the inner wall of the tube will not be smooth, at least because of the existence of a small annular space (at the chamfer) between the ring and the wall. In other words, a slight edge will be presented to a bubble moving along the vial and such edge may cause the bubble to "hang up" in its travel and yield an inaccurate reading. Furthermore, positioning of the marker rings in the grooves is often not exact and often results in imprecise readings.

Another problem with known level vials involves exteriorly-applied marker rings. Since such rings are at least somewhat exposed to contact by foreign objects, portions of such rings can be worn or chipped away over time.

An improved level vial which has a sturdy, breakage-resistant wall, which permits the vial bubble to move smoothly and freely along the vial cavity would be an important advance in the art. Furthermore, such a vial which provides a single-material cavity surface would significantly improve upon the prior art. Finally, an improved vial comprising a machined cylinder with a sleeve molded thereon would solve these noted problems in the prior art.

OBJECTS OF THE INVENTION

It is an object of the invention to provide an improved level vial overcoming some of the problems and shortcomings of the prior art.

Another object of the invention is to provide a level vial which has precisely positioned marker rings.

Another object of the invention is to provide an improved level vial permitting unimpeded movement of the vial bubble.

Still another object of the invention is to provide an improved level vial having marker rings free of ring discontinuities.

Another object of the invention is to provide a level vial having marker rings protected from contact by foreign objects.

Another object of the invention is to provide a vial made of a clear thermoplastic and which has relatively-thick walls and yet substantially avoids core pin breakage during manufacture.

Yet another object of the invention is to provide a method of forming a vial from a cylinder and a sleeve molded thereon.

Another object of the invention is to provide a new method for making the new level vial.

Another object of the invention is to provide a new method which results in a vial wall which is smooth and coextensive.

How these and other objects are accomplished will become apparent from the following descriptions and from the drawings.

SUMMARY OF THE INVENTION

In at least one embodiment, the invention is a vial for use in a level which provides for improved precision. The invention represents a significant advance over the state of the art by providing novel elements, including a cylinder and an overmolded sleeve.

In one embodiment the invention is a method of forming a vial for use in a level, the method comprising providing a cylinder comprised of a first material and having an inner surface defining a cavity; molding a second material around the cylinder; machining the inner surface to a desired shape; and positioning a bubble in the cavity.

In such an embodiment, the cylinder is preferably molded and has an outer surface and the method further comprises embedding a marker ring into the outer surface of the cylinder such that the second material is molded around the marker ring and the marker ring is enclosed by the first material and second material.

The second material may be molded around the cylinder and marker ring by positioning the cylinder and marker ring on a core pin; inserting the core pin into a mold; flowing the second material into the mold; and ejecting the cylinder, marker ring, and second material from the mold. It is preferred that the second material be heated to liquid form and flowed or injected into the mold around the cylinder and then allowed to harden to solid form.

The bubble is preferably positioned in the cavity by partially filling the cavity with a liquid and enclosing the cavity with an end closure. The liquid is preferably has a freezing point below temperatures expected to be encountered during use and may be mineral spirits. The bubble is preferably air.

In some embodiments it may be preferred that the first material have a melting point higher than the second material to facilitate molding of the second material in liquid form around the first material. In certain preferred embodiments, the first material is polycarbonate and the second material is acrylic.

However, it has been found that the same material, acrylic, can be used for both the first and second material if the first material is cooled during molding of the second material. In these embodiments, the first and material and the second material have the same composition and the cylinder is cooled during overmolding such that the cylinder remains solid while the second material is molded about it.

The marker ring is preferably made of a foil-type material which may be metallic, a thermoset material, a thermoplastic material having melting temperatures substantially higher than the melting temperature of the second material, ink, pigment, or other material.

The method may further include putting indicia on the cylinder before the second material is molded around the cylinder to form a sleeve. Such indicia may relate to degrees of pitch, logarithmic information, or other relevant information and may be of the same material as the marker rings. The placement of the marker ring and/or indicia between the cylinder and the sleeve allows the inner surface of the cylinder to be solely comprised of the first material. The inner surface is preferably machined such that the cavity is barrel-shaped. Such machining is facilitating by the uniformity of the inner surface composition.

The invention is also described as an improvement upon a vial for use with a level wherein the vial includes a cylinder having a inner surface defining a cavity; the vial includes a sleeve molded around the cylinder; and a marker ring bounded by the cylinder and the sleeve. In certain embodiments, the cylinder and sleeve have the same composition of acrylic.

In an embodiment of the improvement the vial includes indicia positioned on the outer surface, the indicia bounded by the cylinder and the sleeve. The indicia may be hot stamped, laser printed or otherwise embedded into or positioned on the outer surface of the cylinder but, like the marker rings, does not extend through the inner surface.

The invention also comprises a vial for use with a level, the vial comprising a cylinder having a inner surface defining a cavity, and extending from the first end to the second end; and a sleeve molded around the cylinder and extending from the first end to the second end. In certain embodiments, the vial further comprises a first end closure at the first end and a second end closure at the second end, the vial enclosing a liquid and a bubble. The vial also may comprise at least one marker ring or indicia bounded by the cylinder and the sleeve with the marker ring or indicia hot stamped, printed onto or otherwise positioned on the outer surface of the cylinder before the sleeve is molded thereto.

The invention also includes a vial for use with a level with the vial formed by providing a cylinder having an inner surface defining a cavity; molding a second material (a sleeve) around the cylinder; machining the inner surface to a desired shape; and positioning a bubble in the cavity. It is preferred that the cylinder be molded and have an outer surface with at least one marker ring positioned on or embedded into the outer surface such that the second material is molded around the at least one marker ring and the marker ring is enclosed by the first material and second material. Most preferably two marker rings are provided equidistant to the intended position of the maximum diameter of the cavity.

The sleeve is preferably molded around the cylinder and marker ring(s) by positioning the cylinder and marker ring on a core pin; inserting the core pin into a mold; flowing the second material into the mold; and ejecting the cylinder, marker ring, and second material from the mold. The bubble is preferably positioned in the cavity by partially filling the cavity with a liquid and enclosing the cavity with an end closure. The inner surface of the cylinder is preferably machined such that the cavity is barrel-shaped, i.e., the inner surface is machined to be curvilinear and include a cross section having a maximum diameter. To prevent melting of the cylinder during molding of the second material, it is preferred that the core pin be cooled to keep the cylinder below its melting temperature.

DETAILED DESCRIPTION OF PREFERRED EMBODIMENTS

Figure 1:
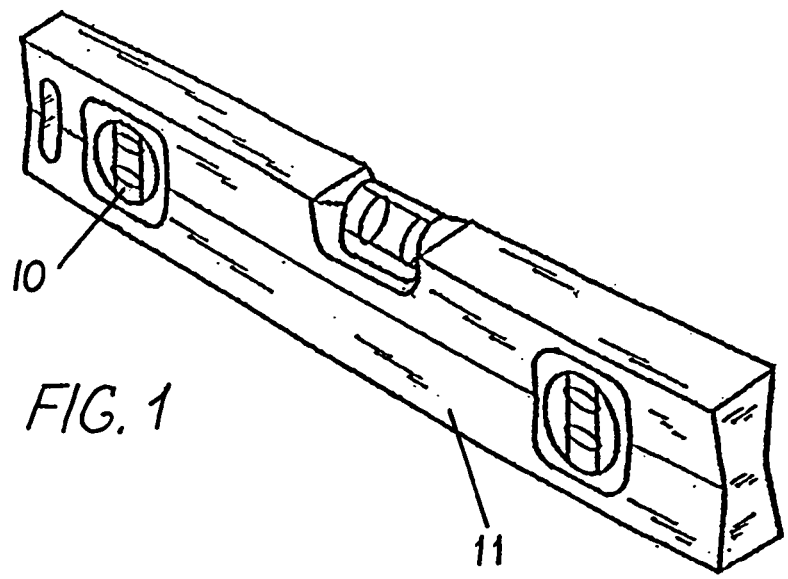
FIG. 1 is a perspective view of a level having three vials.

FIG. 1 is a perspective view of a level 11 having three vials 10. As shown, vials 10 are arranged in predetermined angular relationships to the measuring surface of the level.

Figure 2:
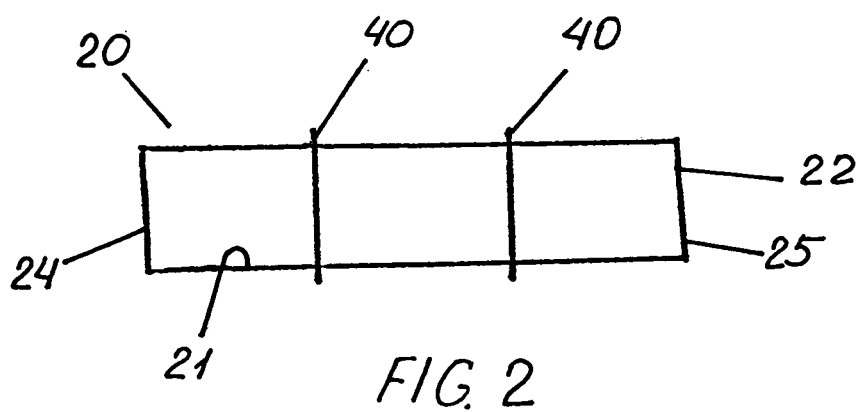
FIG. 2 is a front elevation of a cylinder and marker rings in accordance with the principles of an embodiment of the present invention.
Figure 3:
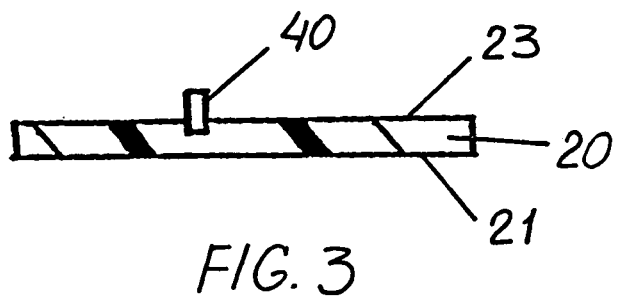
FIG. 3 is an enlarged cross section view of a top portion of the cylinder of FIG. 2.

FIG. 2 is a front elevation of a cylinder 20 and marker rings 40 used to form a vial 10. Cylinder 20 extends from first end 24 to second end 25 and includes an inner surface 21 (see FIG. 3) defining a cavity 22. Cylinder 20 is preferably a transparent plastic, most preferably polycarbonate. As shown in FIG. 3, marker rings 40 are embedded into the outer surface 23 of cylinder 20. Rings 40 may be comprised of foil hot stamped into cylinder 20, ink or pigment printed onto cylinder 20 or other materials positioned on outer surface 23 through other methods. Rings 40 do not penetrate inner surface 21. Rings 40 may be a foil comprising metal, a thermoset material or a thermoplastic with a high melting temperature or ink, pigment or other material.

Figure 4:
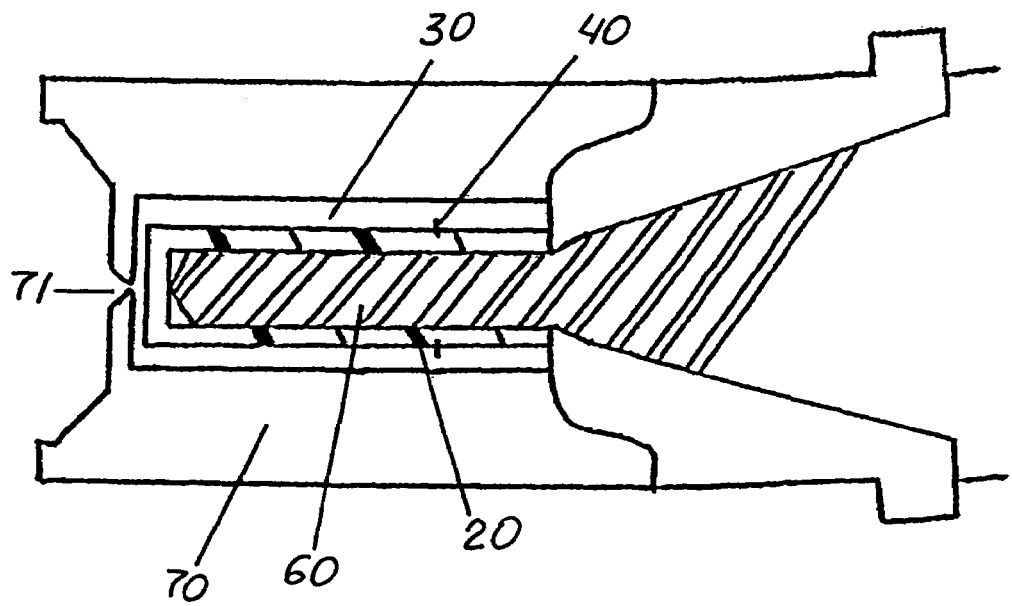
FIG. 4 is a cross section view of a cylinder with marker rings, the cylinder being positioned on a core pin and inserted into a mold with a second material molded over the cylinder in accordance with the principles of an embodiment of the present invention.

FIG. 4 is a cross section view of a cylinder 20 with marker rings 40 positioned on a representative core pin 60 and inserted into a representative mold 70 where a material 30 is flowed around cylinder 20 to form a sleeve 31 molded over the cylinder 20. As is understood, material 30 is injected or otherwise forced through port 71 into the space between mold 70 and cylinder 20 and rings 40. Material 30 is preferably heated and flows into such space before cooling and hardening to form sleeve 31. Sleeve 31 and cylinder 20 are both preferably transparent acrylic and are bound together such that the interface therebetween is indistinguishable.

In the preferred method, the cylinder 20 is formed first, preferably with a core pin and a first mold. Then marker rings 40 or indicia 41 may be hot stamped, printed, or otherwise embedded in or positioned on the outer surface 23 of cylinder 20. After such application of rings or indicia, cylinder 20 is positioned on core pin 60 and is positioned in mold 70 which is larger than the first mold. A flowable material 30, such as heated acrylic, is then injected into the space between mold 70 and the cylinder 20 and rings 40 or indicia 41, if present on outer surface 23. Cylinder 20 is preferably cooled by core pin 60 to prevent it from reaching its melting point from contact with material 30. It is preferred that cylinder 20 and material 30 have the same composition of acrylic. After injection, second material 30 then cools, hardens, and forms sleeve 31 around cylinder 20. At this point, the overmolded dual component vial 10 has sufficient thickness to be machined without risking breakage; therefore, vial 10 is removed from core pin 60 and the inner surface 21 of cylinder 20 is machined such that the cavity 22 is of a desired shape, specifically curvilinear or barrel-shaped.

As is clearly evident in the dual component vial 10, marker rings 40 are not exposed to cavity 22 nor to the external environment. Due to this design, creation of the desired shape of cavity 22 in cylinder 20 does not require specialized machining in which both the first material and the marker rings are machined. Furthermore, rings 40 cannot be damaged during normal use of the level 11.

This method also avoids human error in the placement of marker rings at the proper position in the vial since the stamping procedure consistently positions the rings on vials.

Figure 5:
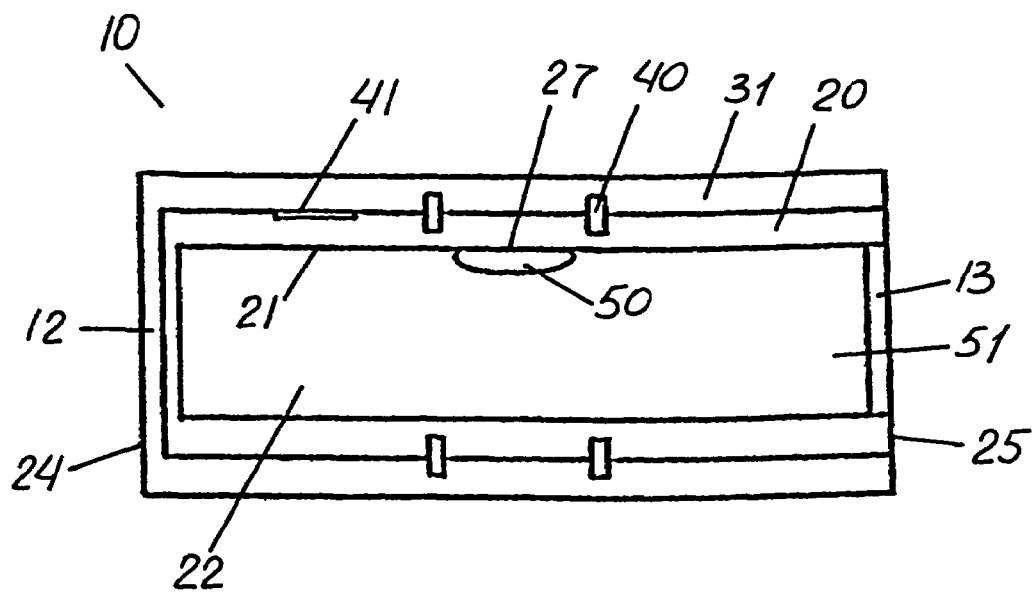
FIG. 5 is a cross section view of a vial in accordance with the principles of an embodiment of the present invention.

FIG. 5 is a cross section view of the finished overmolded vial 10 after it is removed from the mold 70 and core pin 60, partially filled with liquid 51, and capped. Inner surface 21 has been machined to form the desired barrel-shape in which the cavity 22 has a maximum diameter 27. First end closure 12 has been formed during the molding process. The cavity has then been partially filled with liquid 51 and its end 25 has been capped with second end closure 13 to seal cavity 22. Bubble 50 is shown at the maximum diameter 27 between the marker marker rings 40.

Thus, it should be apparent that there has been provided, in accordance with the present invention, a vial for use with levels that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A vial comprising:
a cylinder fanned from a first material, the cylinder having a sidewall with an inner surface defining a cavity and an outer surface;
a sleeve formed from a second material and being molded around and onto the outer surface of the cylinder; and
indicia positioned on the outer surface, the inner surface not being penetrated by the indicia and the indicia being bounded by the cylinder and the sleeve.

2. The vial of claim 1 wherein the first and second materials are acrylic.

3. The vial of claim 2 wherein the cylinder and the sleeve extend from a first end to a second end and, the cavity is partially filled with a liquid to define a bubble, the cavity being sized to receive a first end closure at the first end and a second end closure at the second end.

4. The vial of claim 1 wherein the indicia is hot stamped onto the cylinder.

5. The vial of claim 1 wherein the indicia is at least one marker ring.

6. The vial of claim 1 wherein the inner surface of the overmolded cylinder is machined to form a cavity having a desired shape.

7. A vial comprising:
a cylinder of a first material having a sidewall with an inner surface defining a cavity and an outer surface;
a second material molded around and onto the outer surface of the cylinder to form an overmolded body; and
the inner surface of the body being machined to form a cavity having a desired shape.

8. The vial of claim 7 wherein the first and second materials are the same acrylic material having a melting point and wherein the cylinder is solid and is maintained at a temperature less than the melting point while the second material is molded around the cylinder.

9. The vial of claim 7 wherein the cylinder is molded and has an outer surface, at least one marker ring is embedded into the outer surface, the marker ring not extending through the inner surface, and the second material is molded around the marker ring such that the marker ring is enclosed between the first material and second material.

10. The vial of claim 9 wherein the cavity has a length and a longitudinal cross-section of the desired shape is curvilinear along the length.

11. The vial of claim 10 wherein the cavity is barrel-shaped.

12. The vial of claim 11 wherein the cavity has a maximum diameter and the at least one marker ring is two marker rings such that the maximum diameter is positioned equidistant between the marker rings.

13. The vial of claim 7 wherein a bubble is positioned in the cavity by partially filling the cavity with a liquid and enclosing the cavity with an end closure.

14. The vial of claim 7 wherein the first material is polycarbonate and the second material is acrylic.

15. A vial comprising:
a molded body of a first material having a sidewall extending between an inner surface defining a cavity and an outer surface, the sidewall being sufficiently thin to have been molded to form the cavity to have a desired shape; and
a second material molded around and onto the outer surface of the body to reinforce the sidewall against breakage.

16. The vial of claim 15 wherein the desired shape forms a barrel-shaped cavity.

17. The vial of claim 15 wherein the body is a cylinder.

18. The vial of claim 17 wherein at least one marker ring is embedded into the outer surface, the marker ring not extending through the inner surface, and the second material is molded around and onto the marker ring such that the marker ring is enclosed between the first material and the second material.

* * * * *

UNITED STATES PATENT AND TRADEMARK OFFICE
CERTIFICATE OF CORRECTION

PATENT NO. : 7,086,167 B2  Page 1 of 1
APPLICATION NO. : 10/826853
DATED : August 8, 2006
INVENTOR(S) : Thomas P. Foran It is certified that error appears in the above-identified patent and that said Letters Patent is hereby corrected as shown below:

Column 5, line 48, delete "fanned" and insert --formed--.

Signed and Sealed this

Twenty-first Day of October, 2008

JON W. DUDAS
*Director of the United States Patent and Trademark Office*